United States Patent
Farahat et al.

(10) Patent No.: US 11,973,841 B2
(45) Date of Patent: Apr. 30, 2024

(54) SYSTEM AND METHOD FOR USER MODEL BASED ON APP BEHAVIOR

(71) Applicant: Yahoo Holdings, Inc., Sunnyvale, CA (US)

(72) Inventors: Ayman Farahat, Santa Clara, CA (US); Tarun Bhatia, Burbank, CA (US)

(73) Assignee: Yahoo Ad Tech LLC, New York, NY (US)

( * ) Notice: Subject to any disclaimer, the term of this patent is extended or adjusted under 35 U.S.C. 154(b) by 1207 days.

(21) Appl. No.: 14/982,997

(22) Filed: Dec. 29, 2015

(65) Prior Publication Data

US 2017/0185901 A1   Jun. 29, 2017

(51) Int. Cl.
*G06N 5/04* (2023.01)
*G06F 16/00* (2019.01)
*G06F 16/9535* (2019.01)
*H04L 67/50* (2022.01)
*H04L 67/53* (2022.01)

(52) U.S. Cl.
CPC ............ *H04L 67/535* (2022.05); *G06F 16/00* (2019.01); *G06F 16/9535* (2019.01); *G06N 5/04* (2013.01); *H04L 67/53* (2022.05)

(58) Field of Classification Search
CPC .......... G06N 5/022; G06F 17/16; H04L 67/22
See application file for complete search history.

(56) References Cited

U.S. PATENT DOCUMENTS

| | | | | |
|---|---|---|---|---|
| 2008/0120287 A1* | 5/2008 | Guan | ................ | G06F 17/30867 |
| 2010/0030764 A1* | 2/2010 | Koren | ............... | G06F 17/30029 705/7.29 |
| 2011/0047025 A1* | 2/2011 | Demir | ................ | G06Q 30/0256 705/14.43 |
| 2011/0125700 A1* | 5/2011 | Funada | ............... | G06F 11/3414 706/50 |
| 2011/0231243 A1* | 9/2011 | Bhatia | ................ | G06Q 30/0254 705/14.43 |
| 2012/0010942 A1* | 1/2012 | Bax | ........................ | G06Q 30/02 705/14.41 |
| 2012/0030159 A1* | 2/2012 | Pilaszy | .................. | G06Q 10/00 706/46 |

(Continued)

OTHER PUBLICATIONS

Unnamed "SQL Filters" IBM Knowledge Center [Published Online 2012] [Retrieved Online Aug. 2019] <URL: https://www.ibm.com/support/knowledgecenter/SSSHYH_6.1.0/com.ibm.netcoolimpact.doc6.1/common/dita/data_sql_filters_c.html> (Year: 2012).*

(Continued)

*Primary Examiner* — Ann J Lo
*Assistant Examiner* — Fen Christopher Tamulonis
(74) *Attorney, Agent, or Firm* — Cooper Legal Group LLC (57) ABSTRACT

Systems and methods are provided for building a user model. The system includes a processor and a non-transitory storage medium accessible to the processor. The processor is configured to obtain user data from a database, where the user data include user behavior for a plurality of apps installed on one or more user terminals. The processor selects at least one rating parameters using the user data, where the at least one rating parameters indicates a rating of relevant app usage. The system builds the user model based on a rating matrix comprising the at least one rating parameters.

17 Claims, 8 Drawing Sheets

(56) References Cited

U.S. PATENT DOCUMENTS

| | | | | |
|---|---|---|---|---|
| 2012/0278268 A1* | 11/2012 | Hamalainen | ...... | G06F 17/30029 706/46 |
| 2012/0310745 A1* | 12/2012 | Bhatia | ............ | G06Q 30/02 705/14.66 |
| 2013/0339345 A1* | 12/2013 | Soto Matamala | ...... | H04W 4/21 707/722 |
| 2015/0112918 A1* | 4/2015 | Zheng | ............ | G06Q 30/02 706/48 |
| 2015/0347437 A1* | 12/2015 | Marti | ............ | G06F 17/3097 707/731 |

OTHER PUBLICATIONS

Yu et al. "Parallel Matrix Factorization for Recommender Systems" Knowl. Inf Syst (2014) [Published 2013] [Retrieved Nov. 2019] <URL: https://link.springer.com/content/pdf/10.1007%2Fs10115-013-0682-2.pdf> (Year: 2013).*

Li, Huoran et al. "Characterizing Smartphone Usage Patterns from Millions of Android Users." IMC' 15 ACM [Published Oct. 2015] [Retrieved Jun. 2020] <URL: https://dl.acm.org/doi/pdf/10.1145/2815675.2815686> (Year: 2015).*

Cao, J., Wu, Z., Wang, Y. et al. Hybrid Collaborative Filtering algorithm for bidirectional Web service recommendation. Knowl Inf Syst 36, 607-627 (2013). https://doi.org/10.1007/s10115-012-0562-1 (Year: 2012).*

* cited by examiner

Mean Square Error (MSE) vs. Number of Factors in Factor Matrix

SYSTEM AND METHOD FOR USER MODEL BASED ON APP BEHAVIOR

BACKGROUND

Mobile devices are now ubiquitous and more and more users use their mobile devices to browse mobile contents, update social status, and shop online using mobile devices. Thus, it is imperative to get better models of user's behavior on mobile device. While some features such as demographics might be useful they have two main problems. First, it is not often easy to infer these features. Second, even if available, these features are very general and do not necessarily convey relevant information about the user.

Therefore, there is a need to provide an improved solution for modeling user features based on mobile user activities.

SUMMARY

In a first aspect, a computer system that includes a processor and a non-transitory storage medium accessible to the processor. The processor is configured to obtain user data from a database, where the user data include user behavior for a plurality of apps installed on one or more user terminals. The processor selects at least one rating parameters using the user data, where the at least one rating parameters indicates a rating of relevant app usage. The system builds the user model based on a rating matrix comprising the at least one rating parameters.

In a second aspect, a computer implemented method by a system that includes one or more devices having a processor. In the computer implemented method, the system obtains user data from a database, where the user data comprise user behavior for a plurality of apps installed on one or more user terminals. The system selects at least one rating parameters using the user data, where the at least one rating parameters indicates a rating of relevant app. The system builds the user model based on a rating matrix including the at least one rating parameters. The system estimates app usage using the user model and recommends at least one app candidates based on the app usage.

In a third aspect, the embodiments disclose a non-transitory storage medium configured to store a set of modules. The non-transitory storage medium includes instructions executable to obtain user data from a database, where the user data comprise user behavior for a plurality of apps installed on one or more user terminals. The non-transitory storage medium includes instructions executable to select at least one rating parameters using the user data, where the at least one rating parameters indicates a rating of relevant app. The non-transitory storage medium includes instructions executable to build a user model based on a rating matrix comprising the at least one rating parameters.

It is to be understood that both the foregoing general description and the following detailed description are exemplary and explanatory only and are not restrictive of the invention, as claimed.

DETAILED DESCRIPTION OF THE DRAWINGS

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link.

While one or more publishers and social networks collect more and more user data through different types e-commerce applications, news applications, games, social networks applications, and other mobile applications on different mobile devices, a user may by characterized using his/her mobile behavior related to all the mobile applications. Using these characters, online advertising providers may create more and more audience segments to meet the different targeting goals of different advertisers. Thus, it is desirable for a user model that helps the advertisers to precisely identify the target audience. Further, it would be desirable to use the model to predict user behavior on their mobile devices. The present disclosure provides a computer system that builds the user model based on a rating matrix including the at least one rating parameters, which indicates a rating of one or more apps.

This disclosure provides a system and method for computing reduced dimension user features based on App installs. The system adopts a matrix factorization of userx APPs usage matrix that computes both a user and App representation. Compared to existing methods, the proposed approach is more robust and efficient. The implementation is based on using the Matrix factorization and Spark technology, which may compute the user representation for more than 380 million users in less than 3 hours.

Figure 1:
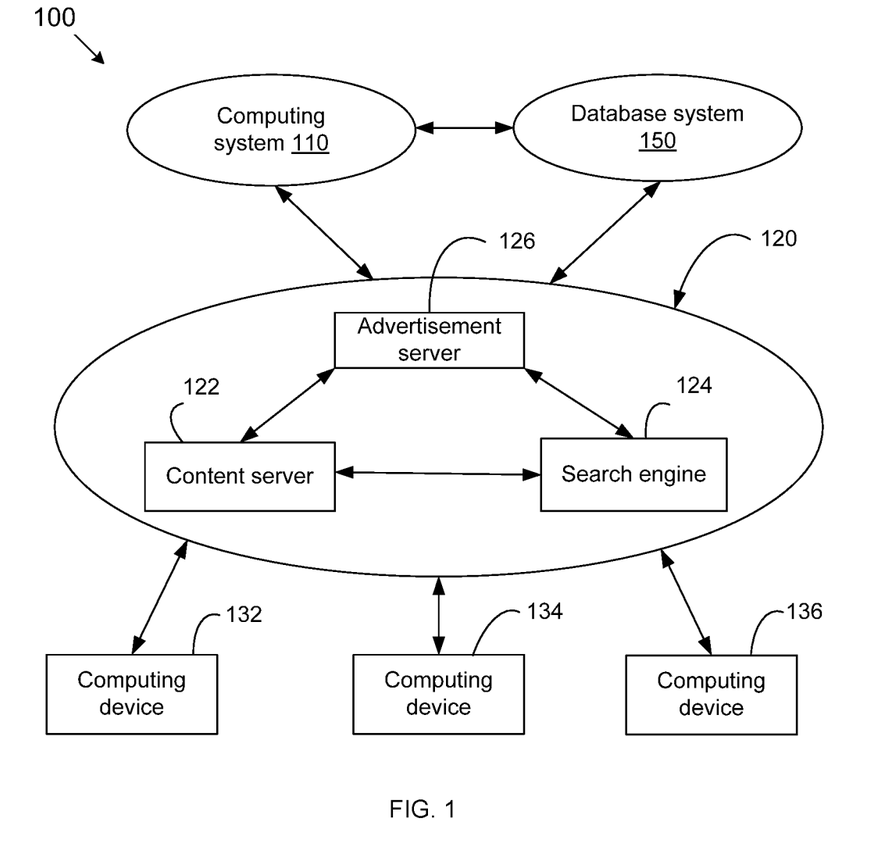
FIG. 1 is a block diagram of an example environment in which a computer system according to embodiments of the disclosure may operate.

Referring now to the drawings, FIG. 1 is a block diagram of an environment 100 in which a computer system according to embodiments of the disclosure may operate. However, it should be appreciated that the systems and methods described below are not limited to use with the particular exemplary environment 100 shown in FIG. 1 but may be extended to a wide variety of implementations.

The environment 100 may include a computing system 110 and a connected server system 120 including a content server 122, a search engine 124, and an advertisement server 126. The computing system 110 may include a cloud computing environment or other computer servers. The server system 120 may include additional servers for additional computing or service purposes. For example, the server system 120 may include servers for social networks, online shopping sites, and any other online services.

The computing system 110 may include a backend computer server. The backend computer server is in communication with the database system 150. The backend computer server is programmed to obtain data in the database 150. For example, the backend computer server is programmed to obtain user data from including user behavior for a plurality of apps installed on one or more user terminals. The backend computer server is programmed to select at least one rating parameters using the user data, where the at least one rating parameters indicates a rating of relevant app. The backend computer server is programmed to build the user model based on a rating matrix including the at least one rating parameters.

The content server 122 may be a computer, a server, or any other computing device known in the art, or the content server 122 may be a computer program, instructions, and/or software code stored on a computer-readable storage medium that runs on a processor of a single server, a plurality of servers, or any other type of computing device known in the art. The content server 122 delivers content, such as a web page, using the Hypertext Transfer Protocol and/or other protocols. The content server 122 may also be a virtual machine running a program that delivers content.

The search engine 124 may be a computer system, one or more servers, or any other computing device known in the art, or the search engine 124 may be a computer program, instructions, and/or software code stored on a computer-readable storage medium that runs on a processor of a single server, a plurality of servers, or any other type of computing device known in the art. The search engine 124 is designed to help users find information located on the Internet or an intranet.

The advertisement server 126 may be a computer system, one or more computer servers, or any other computing device known in the art, or the advertisement server 126 may be a computer program, instructions and/or software code stored on a computer-readable storage medium that runs on a processor of a single server, a plurality of servers, or any other type of computing device known in the art. The advertisement server 126 is designed to provide digital ads to a web user based on display conditions requested by the advertiser. The advertisement server 126 may include computer servers for providing ads to different platforms and websites.

The computing system 110 and the connected server system 120 have access to a database system 150. The database system 150 may include memory such as disk memory or semiconductor memory to implement one or more databases. At least one of the databases in the database system may be a user database that stores information related to a plurality of users. The user database may be organized on a user-by-user basis such that each user has a unique record file. The record file may include all information related to a specific user from all data sources. For example, the record file may include personal information of the user, search histories of the user from the search engine 124, web browsing histories of the user from the content server 122, or any other information the user agreed to share with a service provider that is affiliated with the computer server system 120.

The environment 100 may further include a plurality of computing devices 132, 134, and 136. The computing devices may be a user terminal including a computer, a smart phone, a personal digital aid, a digital reader, a Global Positioning System (GPS) receiver, or any other device that may be used to access the Internet.

The disclosed system and method for building user models may be implemented by the computing system 110. Alternatively or additionally, the system and method for building user models may be implemented by one or more of the servers in the server system 120. The disclosed system may instruct the computing devices 132, 134, and 136 to display all or part of the user interfaces to request input from the advertisers. The disclosed system may also instruct the computing devices 132, 134, and 136 to display all or part of the brand performance to the advertisers.

Generally, an advertiser or any other user may use a computing device such as computing devices 132, 134, and 136 to access information on the server system 120 and the data in the database 150. The advertiser may want to identify a parameter for an advertisement campaign. Based on the observational data, the advertiser may want to measure synthetic impact of ad exposure from different platforms. One of the technical problems solved by the disclosure is to increase the efficiency of advertisement campaign setup so that an advertiser may reach maximum benefit with minimum cost.

Further, the system solves technical problems presented by managing large amounts of user data represented by different user data collected by all types of mobile apps. Through processing collected data, the systems builds a user model based on a rating matrix including the at least one rating parameters.

Figure 2:
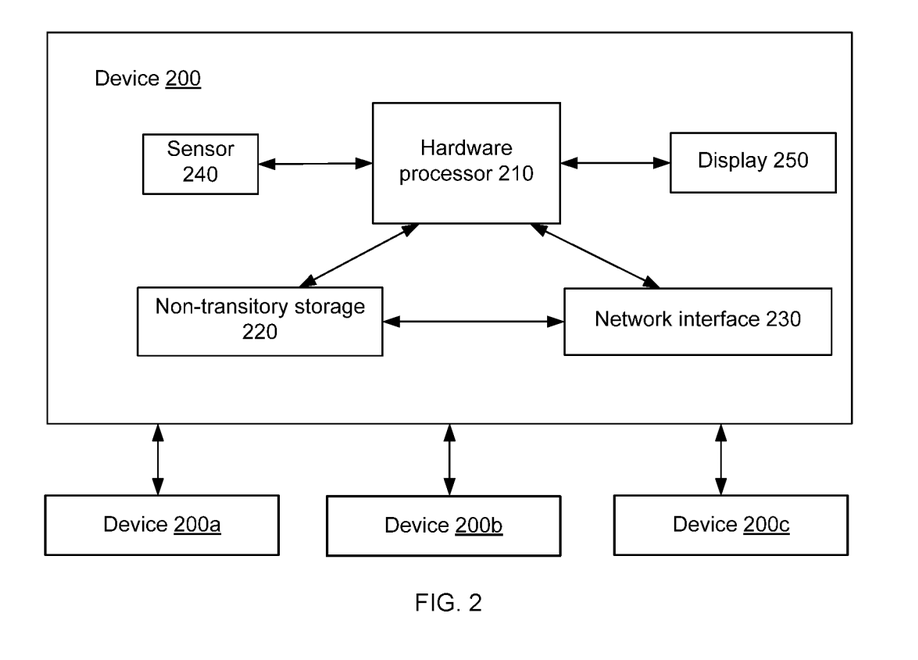
FIG. 2 illustrates an example computing device in the computer system.

FIG. 2 illustrates an example computing device 200 for interacting with the advertiser. The computing device 200 may communicate with a computer server of the system. The computing device 200 may be a computer, a smartphone, a server, a terminal device, or any other computing device including a hardware processor 210, a non-transitory storage medium 220, and a network interface 230. The hardware processor 210 accesses the programs and data stored in the non-transitory storage medium 220. The device 200 may further include at least one sensor 240, circuits, and other electronic components. The device may communicate with other devices 200a, 200b, and 200c via the network interface 230.

The computing device 200 may display user interfaces on a display unit 250. For example, the computing device 200 may display a user interface on the display unit 250 asking the advertiser to input one or more keywords. The user interface may provide checkboxes, dropdown selections or other types of graphical user interfaces for the advertiser to select geographical information, demographic information, mobile application information, technology information, publisher information, or other information related to features of an audience segment.

The computing device 200 may further display the predicted performance using the user model. The computing device 200 may also display one or more drawings or figures that have different formats such as bar charts, pie charts, trend lines, area charts, etc. The drawings and figures may represent a prediction of a group of users based on the user model.

Figure 3:
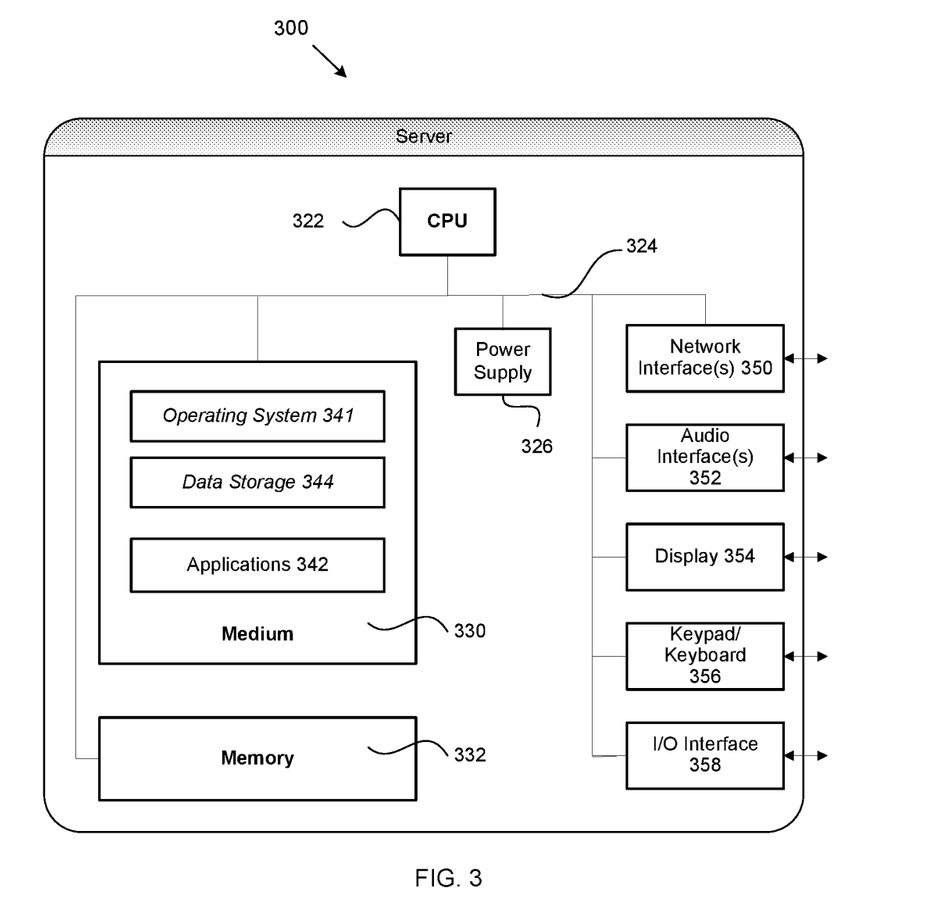
FIG. 3 illustrates an example embodiment of a server computer for building a keyword index for an audience segment.

FIG. 3 is a schematic diagram illustrating an example embodiment of a server. A server 300 may include different hardware configurations or capabilities. For example, a server 300 may include one or more central processing units 322, memory 332 that is accessible to the one or more central processing units 322, one or more medium 630 (such as one or more mass storage devices) that store application programs 342 or data 344, one or more power supplies 326, one or more wired or wireless network interfaces 350, one or more input/output interfaces 358. The memory 332 may include non-transitory storage memory and transitory storage memory.

A server 300 may also include one or more operating systems 341, such as Windows Server, Mac OS X, Unix, Linux, FreeBSD, or the like. Thus, a server 300 may include, as examples, dedicated rack-mounted servers, desktop computers, laptop computers, set top boxes, integrated devices combining various features, such as two or more features of the foregoing devices, or the like.

The server 300 in FIG. 3 may serve as any computer server shown in FIG. 1. The server 300 may also serve as a computer server that implements the computer system for building user models based on app behavior. In either case, the server 300 is in communication with a database that stores historical app behavior data. The historical app behavior data may include user treatment data, user feature data, and observational data. The user treatment data may include at least one of: rating parameters, normalized usage time, and log usage time. Other user data may be stored and processed as well.

Figure 4A:
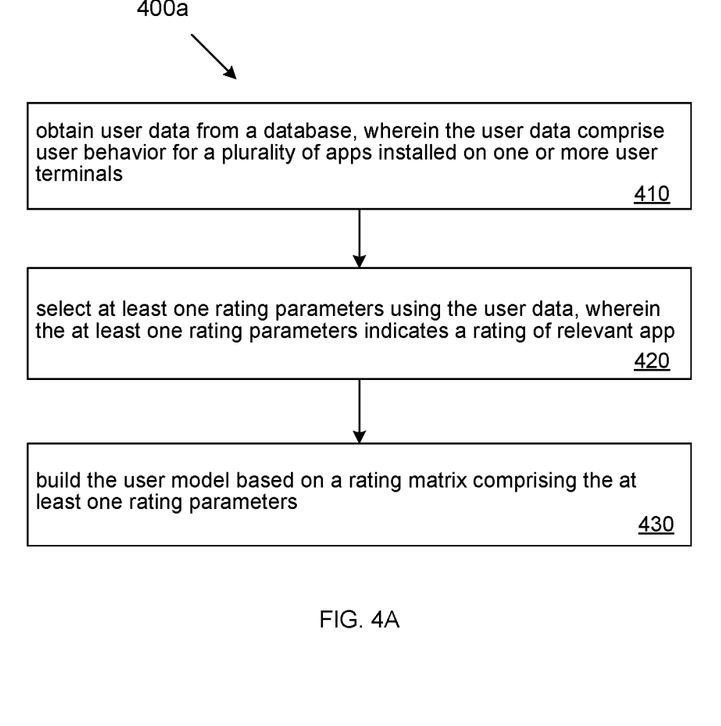
FIG. 4A is an example flow diagram illustrating embodiments of the disclosure, including an example diagram for building a user model.

FIG. 4A is an example flow diagram illustrating embodiments of the disclosure. In FIG. 4A, an example diagram 400a is illustrated for building a user model. The system includes a processor and a non-transitory storage medium accessible to the processor.

In block 410, the processor is configured to obtain user data from a database, where the user data include user behavior for a plurality of apps installed on one or more user terminals. Generally, the user behavior may be collected by the mobile operating system or other applications and then reported to a remote server. The user behavior may include raw data or processed data. The raw data may include all the usage data while the processed data may only include data of particular characteristic. The raw data may have a huge size when millions of users are using the app daily and generates user content related to the app. Even the processed data may be huge because of the number of app users and multiple interactions with the app.

In block 420, the processor is configured to select at least one rating parameters using the user data, wherein the at least one rating parameters indicates a rating of relevant app. The at least one rating parameters include at least one of the following: an explicit rating by a user; and an implicit rating. For example, the explicit rating may be assigned by the user directly in the APP store. The implicit rating may include usage time that represents time spent on an app in a preset time period and interaction frequency indicating a frequency of accessing the app. The rating parameters may also include normalized usage time that represents a ratio of the usage time compared with aggregate app statistics for a group of users with a preset common character. The system may use rating parameters including log usage time that represents a log transformation to account for marginal utility.

Figure 7:
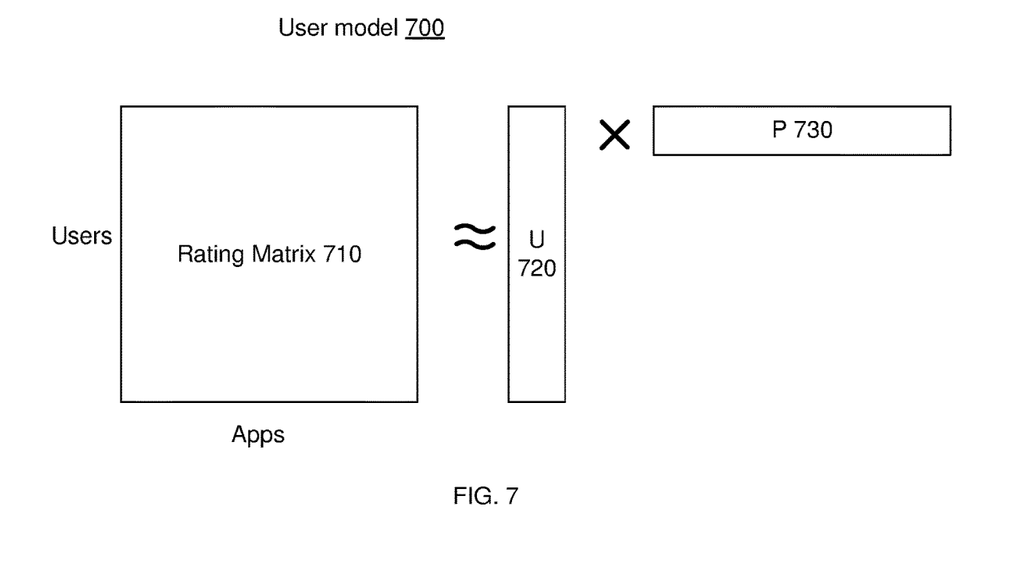
FIG. 7 is an example user model according to embodiments of the disclosure.

In block 430, the processor is configured to build the user model based on a rating matrix including the at least one rating parameters. An example of the rating matrix is illustrated in FIG. 7. The rating matrix 710 may include a first dimension indicating a plurality of users of the app. The rating matrix 710 may include a second dimension indicating a plurality of users. The system approximates the matrix 710 using a first factor matrix U and a second factor matrix P.

Figure 4B:
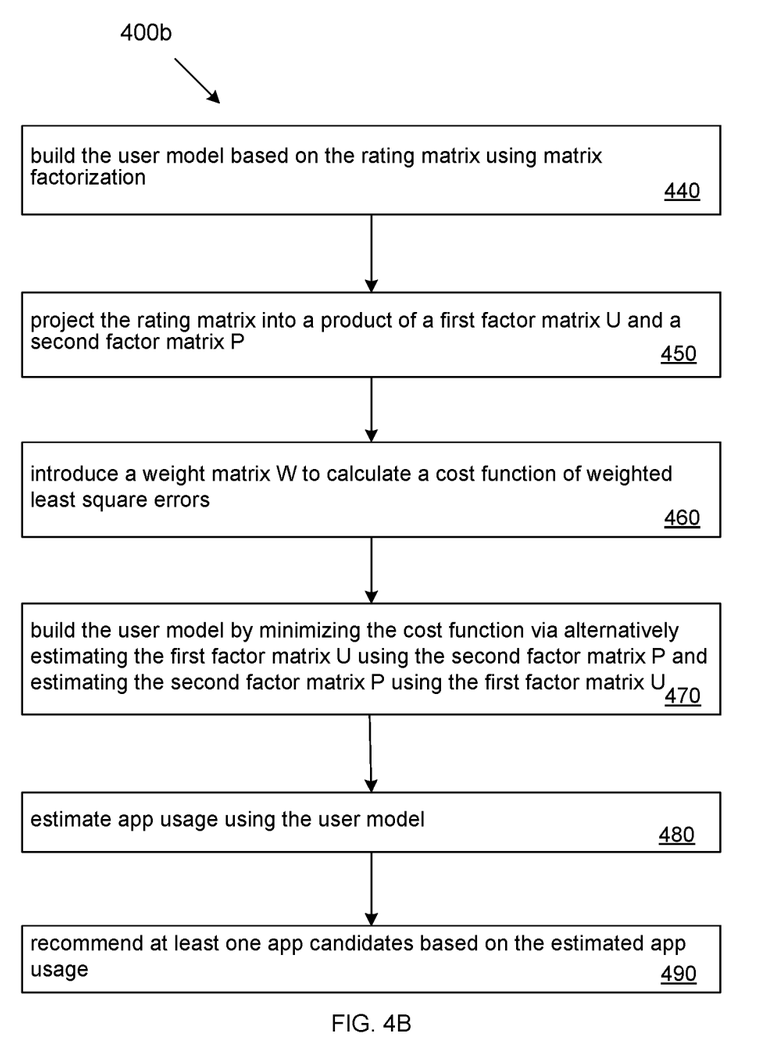
FIG. 4B is an example flow diagram illustrating embodiments of the disclosure, including an example diagram for recommending an app candidate.

FIG. 4B is an example flow diagram illustrating embodiments of the disclosure. The processor may be configured to implement the flow chart 400b in FIG. 4B in addition to the flow chart 400a.

In block 440 of FIG. 4B, the processor is configured to build the user model based on the rating matrix using matrix factorization. The processor may use different methods to realize matrix factorization. For example, the processor may build the user model using collaborative filtering.

In block 450, the processor is configured to project the rating matrix into a product of a first factor matrix U and a second factor matrix P. The first factor matrix U represents users while the second factor matrix P represents apps. The processor projects the user matrix to lower dimension space of dimension K, which indicate the number of features.

In block 460, the processor is configured to introduce a weight matrix W to calculate a cost function of weighted least square errors. The weight matrix W may give more weight to more relevant features and less weight to less relevant features. The weight matrix may need to be updated from time to time.

In block 470, the processor is configured to build the user model by minimizing the cost function via alternatively estimating the first factor matrix U using the second factor matrix P and estimating the second factor matrix P using the first factor matrix U. For example, the processor may implement a matrix factorization algorithm that uses Alternating Least Squares with Weighted-Lamda-Regularization (ALS-WR). The ALS-WR may factor the user to rating matrix R into the user-to-feature matrix U and the rating-to-feature matrix M. The ALS algorithm may be configured to run in a parallel fashion.

In block 480, the processor is configured to estimate app usage using the user model. After obtaining the matrices U and P, the processor may estimate a rating of an app that is not installed by U. The processor may need to update matrices U and P from time to time to get the latest usage data from different users on different apps.

In block 490, the processor is configured to recommend at least one app candidates based on the estimated app usage. Using the estimated rating, the processor may recommend an app to users having an estimated rating greater than a preset threshold. Alternatively or additionally, the processor may recommend users to app developers as potential candidates so that the app developers may further select from the recommended users.

Figure 5A:
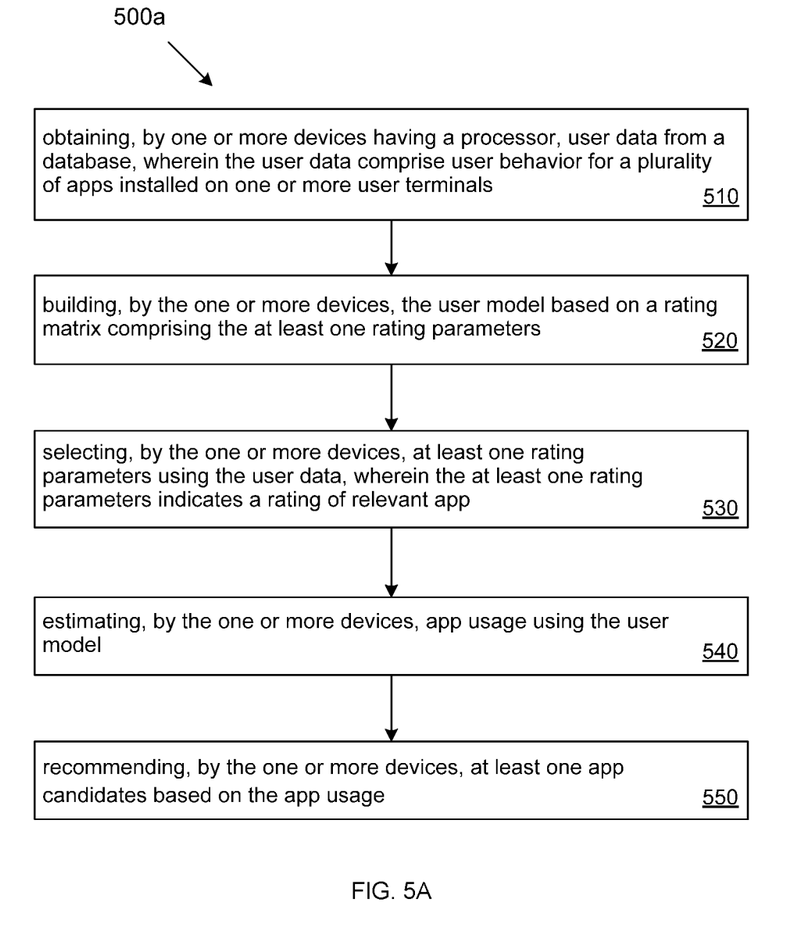
FIG. 5A is an example flow diagram illustrating embodiments of the disclosure, including an example diagram for recommending an app candidate.

FIG. 5A is an example flow diagram illustrating embodiments of the disclosure. FIG. 5A shows a method 500a that may be implemented by a computer system including one or more devices having a processor. The method 500a may include following acts.

In act 510, the one or more devices obtain user data from a database, where the user data include user behavior for a plurality of apps installed on one or more user terminals. The user data may be tagged using different user identifications. The user behavior may include app usage data on each app installed on each device if the device user agrees to share the usage data with the data collector.

In act 520, the one or more devices select at least one rating parameters using the user data, where the at least one rating parameters indicates a rating of relevant app. The rating parameters may include an explicit rating by a user. Alternatively or additionally, the rating parameters may include an implicit rating, which may include usage time that represents time spent on an app in a preset time period and interaction frequency indicating a frequency of accessing the app. The rating parameters may include normalized usage time that represents a ratio of the usage time compared with aggregate app statistics for a group of users with a preset common character. The rating parameters may include log usage time that represents a log transformation to account for marginal utility.

In act 530, the one or more devices build the user model based on a rating matrix including the at least one rating parameters. The rating matrix may be a sparse matrix that includes ratings from millions of users to thousands of apps.

In act 540, the one or more devices estimate app usage using the user model. The devices may estimate the app usage using the user model including a rating matrix, which is approximated as a product of a first factor matrix U and a second factor matrix P.

In act 550, the one or more devices recommend at least one app candidates based on the app usage. The devices may include a backend server in a computer system. The devices may recommend the at least one app candidates to users who may be very likely to install and use the at least one app.

Figure 5B:
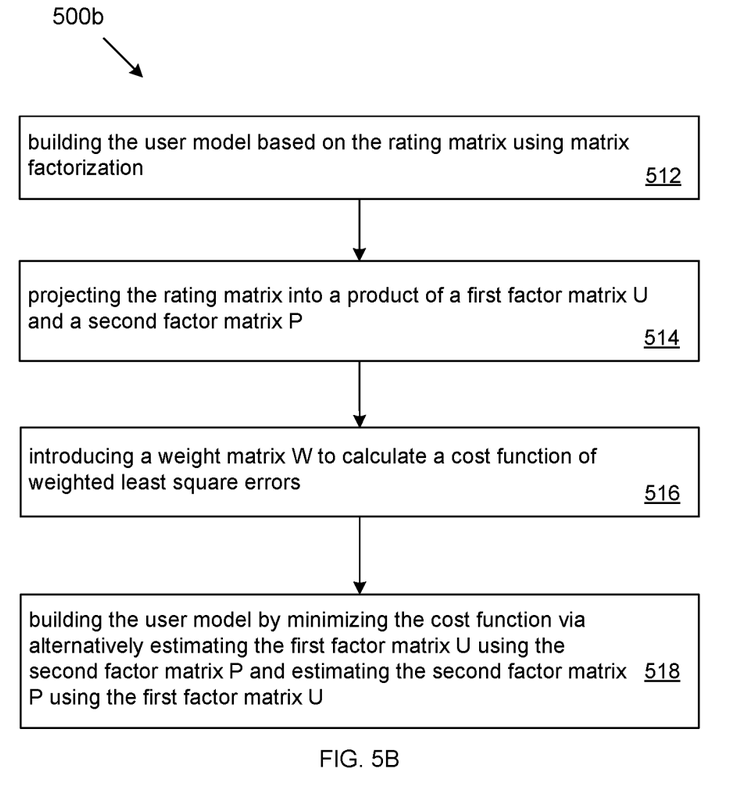
FIG. 5B is an example flow diagram illustrating embodiments of the disclosure, including an example diagram for building a user model.

FIG. 5B is an example flow diagram illustrating embodiments of the disclosure. The acts 500b in FIG. 5B may be combined with the method 500a in FIG. 5A.

In FIG. 5B, the one or more devices build the user model based on the rating matrix using matrix factorization in act 512. Generally, matrix factorization is to factorize a matrix to find out two (or more) matrices such that when multiplying them will get back to the original matrix. Matrix factorization may be used to discover latent features underlying the interactions between two different kinds of entities.

In act 514, the one or more devices project the rating matrix into a product of a first factor matrix U and a second factor matrix P. Let R be the rating matrix that contains all the ratings that the users have assigned to the items. Assume that there are K latent features. The matrix factorization is to find two matrices U and P such that their product approximates R. In this way, each row of U would represent the strength of the associations between a user and the features. Similarly, each row of P would represent the strength of the associations between an item and the features. The item may be a mobile application in this disclosure.

In act 516, the one or more devices introduce a weight matrix W to calculate a cost function of weighted least square errors. The weight matrix W may be a diagonal matrix containing weights, where each weight is reciprocal of error variance.

In act 518, the one or more devices build the user model by minimizing the cost function via alternatively estimating the first factor matrix U using the second factor matrix P and estimating the second factor matrix P using the first factor matrix U.

Figure 6:
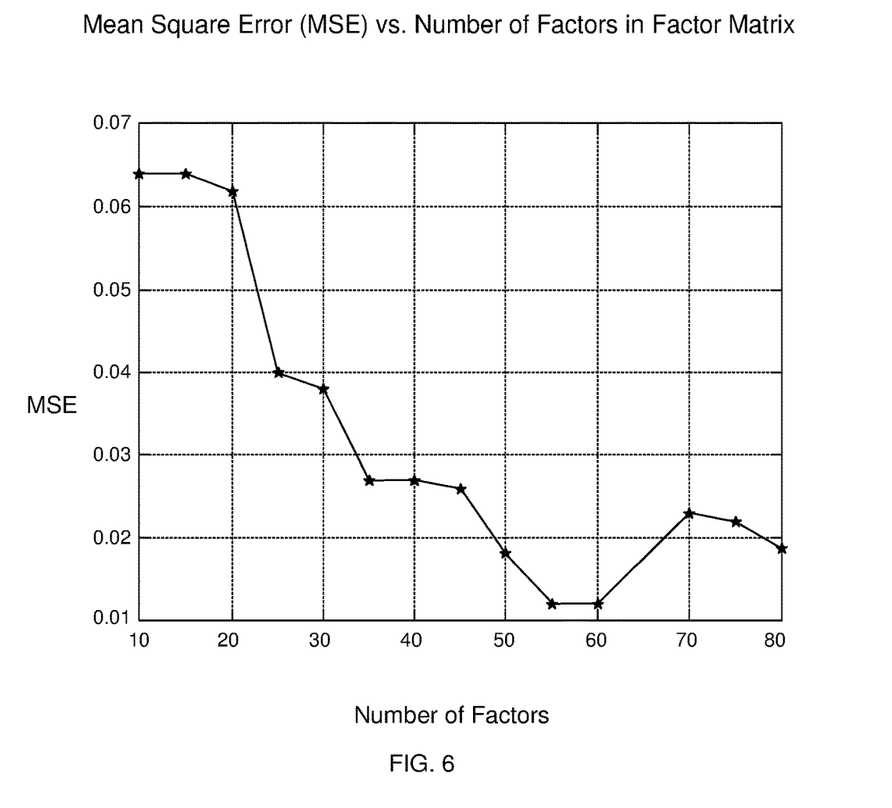
FIG. 6 is a diagram illustrating embodiments of the disclosure, including a diagram that illustrates mean square error (MSE) changes when a factor matrix includes different number of factors.

FIG. 6 is a diagram illustrating embodiments of the disclosure. In FIG. 6 illustrates the mean square error (MSE) changes when the factor matrix includes different number of factors. The collected data on App usage time for 380 Million users. These users used 58,000 Apps for a week in 2015. The method filters out users who had usage time less than 1 second and greater than 420 minutes. The next step is to select the optimum number of factors. For example, the system experiments with a range between 10 and 80 when the number of App categories is 65. From FIG. 6, the best result is achieved when the number of factors is between 55 and 60. The number of factors may be selected as 60.

FIG. 7 is an example user model according to embodiments of the disclosure. In the user model, the rating matrix 710 is approximated by the product of user matrix 720 and the item matrix 730. The user matrix include a plurality of features $f(i)$ while the item matrix include a plurality of features $f(j)$. The method and device may try to obtain the features using one ore more equations iteratively.

In this disclosure, system and method are provided for computing reduced dimension user features based on App installs. The method adopts matrix factorization of a user matrix and an App usage matrix which computes both a user and App representation. The system may use a very large scale implementation based on the Matrix factorization and Spark technology.

It is therefore intended that the foregoing detailed description be regarded as illustrative rather than limiting, and that it be understood that it is the following claims, including all equivalents, that are intended to define the spirit and scope of this invention.

What is claimed is:

1. A system for building a user model, comprising:
a processor and a non-transitory storage medium accessible to the processor, the processor configured to:
obtain user data from a database, wherein the user data comprise user behavior for a plurality of apps installed on one or more user terminals;
select at least one rating parameter using the user data, wherein the at least one rating parameter indicates an explicit rating, assigned by a user in an app store, of at least one app in the app store;
build the user model based on a user-to-rating matrix comprising the at least one rating parameter, wherein the user-to-rating matrix comprises a first dimension indicating a plurality of users of the at least one app in the app store and a second dimension indicating the plurality of apps, wherein the building the user model comprises implementing a matrix factorization algorithm that uses Alternating Least Squares with Weighted-Lambda-Regularization (ALS-WR) to factor the user-to-rating matrix into a user-to-feature matrix and a rating-to-feature matrix;
estimate app usage using the user model built based on the user-to-rating matrix indicating the plurality of users of the at least one app in the app store; and
provide a recommendation of two or more candidate users, of the plurality of users of the at least one app in the app store that are indicated in the user-to-rating matrix used to build the user model used to estimate the app usage, to one or more app developers based on the app usage, wherein the recommendation comprises a first selectable option corresponding to a first candidate user of the two or more candidate users and a second selectable option corresponding to a second candidate user of the two or more candidate users.

2. The system of claim 1, wherein the at least one rating parameter comprises:
an implicit rating, the implicit rating comprising usage time that represents time spent on an app in a preset time period and interaction frequency indicating a frequency of accessing the app.

3. The system of claim 1, wherein the at least one rating parameter comprises:
normalized usage time that represents a ratio of usage time compared with aggregate app statistics for a group of users with a preset common characteristic.

4. The system of claim 1, wherein the at least one rating parameter comprises:
log usage time that represents a log transformation to account for marginal utility.

5. The system of claim 1, wherein the first selectable option corresponding to the first candidate user is selected from the recommendation by the one or more app developers.

6. The system of claim 1, wherein the at least one rating parameter comprises:
an implicit rating, the implicit rating comprising usage time that represents time spent on an app in a preset time period.

7. The system of claim 1, wherein the at least one rating parameter comprises:
an implicit rating, the implicit rating comprising an interaction frequency indicating a frequency of accessing an app.

8. A method for building a user model, comprising:
obtaining, by one or more devices having a processor, user data from a database, wherein the user data comprise user behavior for a plurality of apps installed on one or more user terminals;
selecting, by the one or more devices, at least one rating parameter using the user data, wherein the at least one rating parameter indicates an explicit rating, assigned by a user in an app store, of at least one app in the app store;
building, by the one or more devices, the user model based on a user-to-rating matrix comprising the at least one rating parameter, wherein the user-to-rating matrix comprises a first dimension indicating a plurality of users of the at least one app in the app store and a second dimension indicating the plurality of apps, wherein the building the user model comprises implementing a matrix factorization algorithm that uses Alternating Least Squares with Weighted-Lambda-Regularization (ALS-WR) to factor the user-to-rating matrix into a user-to-feature matrix and a rating-to-feature matrix;
estimating, by the one or more devices, app usage using the user model built based on the user-to-rating matrix indicating the plurality of users of the at least one app in the app store; and
providing, by the one or more devices, a recommendation of two or more candidate users, of the plurality of users of the at least one app in the app store that are indicated in the user-to-rating matrix used to build the user model used to estimate the app usage, to one or more app developers based on the app usage, wherein the recommendation comprises a first selectable option corresponding to a first candidate user of the two or more candidate users and a second selectable option corresponding to a second candidate user of the two or more candidate users.

9. The method of claim 8, wherein the at least one rating parameter comprises:
an implicit rating.

10. The method of claim 8, wherein the at least one rating parameter comprises:
normalized usage time that represents a ratio of usage time compared with aggregate app statistics for a group of users with a preset common characteristic.

11. The method of claim 8, wherein the at least one rating parameter comprises:
log usage time that represents a log transformation to account for marginal utility.

12. The method of claim 8, wherein the first selectable option corresponding to the first candidate user is selected from the recommendation by the one or more app developers.

13. The method of claim 9, wherein the implicit rating comprises usage time that represents time spent on an app in a preset time period and interaction frequency indicating a frequency of accessing the app.

14. The method of claim 8, wherein the at least one rating parameter comprises:

an implicit rating, the implicit rating comprising an interaction frequency indicating a frequency of accessing an app.

15. A non-transitory storage medium comprising instructions that when executed perform operations comprising:

obtain user data from a database, wherein the user data comprise user behavior for a plurality of apps installed on one or more user terminals;

select at least one rating parameter using the user data, wherein the at least one rating parameter indicates an explicit rating, assigned by a user in an app store, of at least one app in the app store;

build a user model based on a user-to-rating matrix comprising the at least one rating parameter, wherein the user-to-rating matrix comprises a first dimension indicating a plurality of users of the at least one app in the app store and a second dimension indicating the plurality of apps; and provide a recommendation of two or more candidate users, of the plurality of users of the at least one app in the app store that are indicated in the user-to-rating matrix used to build the user model, to one or more app developers based on the user model, wherein the recommendation comprises a first selectable option corresponding to a first candidate user of the two or more candidate users and a second selectable option corresponding to a second candidate user of the two or more candidate users.

16. The non-transitory storage medium of claim 15, wherein the first selectable option corresponding to the first candidate user is selected from the recommendation by the one or more app developers.

17. The non-transitory storage medium of claim 15, the operations comprising:

estimate app usage using the user model.

* * * * *